United States Patent [19]

Kuramoto

[11] Patent Number: 5,041,308
[45] Date of Patent: Aug. 20, 1991

[54] METHOD OF COATING SILICON PARTICLES
[75] Inventor: Makoto Kuramoto, Amagasaki, Japan
[73] Assignee: Osaka Titanium Co., Ltd., Hyogo, Japan
[21] Appl. No.: 449,776
[22] Filed: Dec. 13, 1989
[30] Foreign Application Priority Data
Dec. 21, 1988 [JP] Japan .................................. 63-324010
Nov. 2, 1989 [JP] Japan .................................. 1-286989
[51] Int. Cl.$^5$ .............................................. B05D 7/00
[52] U.S. Cl. .................................... 427/213; 427/215; 427/255; 427/255.1; 427/314
[58] Field of Search ............ 427/213, 215, 255, 255.1, 427/314

Primary Examiner—Bernard Pianalto
Attorney, Agent, or Firm—Oblon, Spivak, McClelland, Maier & Neustadt

[57] ABSTRACT

An apparatus for heating polycrystalline silicon, in which polycrystalline silicon of semiconductor grade placed in the reaction vessel is directly heated by means of a heater outside of the reaction vessel where the inner surface of the reaction vessel is formed of graphite coated with highly pure silicon and having a thickness of 100 microns or more.

14 Claims, 4 Drawing Sheets

１

METHOD OF COATING SILICON PARTICLES

BACKGROUND OF THE INVENTION

1. Field of the Invention

The present invention relates to an apparatus for heating polycrystalline silicon used for the production of semiconductor grade polycrystalline silicon by the fluidized-layer method, the heat treatment of semiconductor grade polycrystalline silicon produced by the bell-jar method and the fluidized-layer method and the like.

2. Discussion of the Background

The typical conventional method of producing semiconductor grade polycrystalline silicon is the bell-jar method. In this method, a silicon rod put in a bell-jar type reaction vessel is electrified and thereby heated and a gas mixture of semiconductor grade trichlorosilane and semiconductor grade hydrogen or monosilane and semiconductor grade hydrogen is introduced into the reaction vessel under conditions sufficient to deposit semiconductor grade silicon on a surface of the heated silicon rod.

In addition, the production of polycrystalline silicon by the fluidized-layer method has also recently been started. In the production of polycrystalline silicon by the fluidized-layer method, small pieces of polycrystalline silicon having particle sizes of 0.1 to 3 mm are charged into a reaction vessel and a reaction gas comprising trichlorosilane or monosilane and the like of semiconductor grade is introduced into the reaction vessel while heating the reaction vessel by means of an outside heater. The small pieces of silicon within the reaction vessel are fluidized and silicon of semiconductor grade is deposited on the surface of the small pieces of silicon.

Polycrystalline silicon produced by the bell-jar method and the fluidized-layer method is used as a material for production of, for example, single-crystalline silicon. However, in the case where polycrystalline silicon is turned into single-crystalline silicon by the Chokralskii method, the polycrystalline silicon bursts and scatters when heated up to its melting point. It is said that this bursting phenomenon occurs due to thermal strain resulting from the high-speed heating of polycrystalline silicon or expansion of gases remaining in the product. In order to prevent this bursting phenomenon, polycrystalline silicon of semiconductor grade produced by the bell-jar method and the fluidized layer method has been subjected to a heat treatment at 600° to 1,400° C. to remove the thermal strain and remaining gases.

In this heat treatment, semiconductor grade polycrystalline silicon within the reaction vessel is heated by means of an outside heater while passing an inert gas through the reaction vessel. Then, the polycrystalline silicon is subjected to the heat treatment at 600° to 1,400° C., whereby the thermal strain and the remained gases are removed Here, semiconductor grade indicates concentrations of impurities such that $[B] < 0.5$ ppba, $[P] < 0.5$ ppba, $[C] < 0.4$ ppma, and a total concentration of heavy metals $< 30$ ppba. These concentrations are judged as suitable for the starting material for single-crystalline semiconductor grade silicon produced by the Chokralskii method.

However, comparing the bell-jar method with the fluidized-layer method of producing polycrystalline silicon, the former is a batch type process and requires the assembly and disassembly of the vessel while the latter is a continuous type process and does not require the assembly and disassembly. In addition, in the former, the reaction vessel is cooled but in the latter the reaction vessel is not cooled. Furthermore, the reaction surface area of the latter is larger than that of the former. In view of the above described characteristics, production by the fluidized-layer method is more efficient and requires a reduced consumption of electric power in comparison with the bell-jar method.

However, in the production of polycrystalline silicon by this fluidized-layer method, the reaction vessel is directly heated and small pieces of silicon are brought into direct contact with the wall of the reaction vessel, so that contamination of silicon due to the wall of the reaction vessel becomes a problem. A similar problem also occurs in the heat treatment of polycrystalline silicon in which silicon is brought into direct contact with the wall of the reaction vessel. This problem arises from the fact that the conventional reaction vessel is made of graphite, quartz, SiC and the like.

That is to say, in the reaction vessel made of graphite, polycrystalline silicon is brought into contact with the graphite wall when heated, so that carbon (C) enters the polycrystalline silicon from the graphite wall to contaminate the polycrystalline silicon with carbon. At the same time, since the porosity of graphite is large, there is the possibility that impurities outside of the reaction vessel may diffuse into the polycrystalline silicon inside of the reaction vessel.

In a reaction vessel made of quartz, quartz itself contains impurities in quantities of about 0.1 ppm, and is thereby a contamination source for polycrystalline silicon at high temperatures. Besides, in the case where polycrystalline silicon is produced by the fluidized-layer method, there is the possibility that silicon will be deposited and stuck onto the reaction vessel, whereby cracks are produced due to the difference between the thermal expansion coefficient deposited silicon and the reaction vessel.

In a reaction vessel made of SiC, there is the possibility that carbon will enter the polycrystalline silicon from the SiC to contaminate the polycrystalline silicon with carbon in the same manner as in the reaction vessel made of graphite. In addition, in order to enhance the mechanical strength of the reaction vessel, an outer cylinder made of metal is placed on the outside of the reaction vessel, which is heated from the outside of the outer cylinder in many cases. The present inventors have discovered that there is also the possibility that impurities contained in the outer cylinder can contaminate the polycrystalline silicon within the reaction vessel through the reaction vessel.

SUMMARY OF THE INVENTION

Accordingly, one object of the present invention is to provide an apparatus for heating polycrystalline silicon which is capable of suppressing the contamination of semiconductor grade polycrystalline silicon within the reaction vessel.

This and other objects which will become apparent from the following specification have been achieved by the present apparatus for heating polycrystalline silicon, in which semiconductor grade polycrystalline silicon is put into a reaction vessel and is directly heated by means of a heater from an outer surface of the reaction vessel, where the inner surface of the reaction vessel is formed of graphite coated with highly pure silicon having a thickness of 100 μm or more.

BRIEF DESCRIPTION OF THE DRAWINGS

A more complete appreciation of the invention and many of the attendant advantages hereof will be readily obtained as the same becomes better understood by reference to the following detailed description when considered in connection with accompanying drawings, wherein.

In the figures, the numerals represent the following: 1: Reaction vessels; 1': Graphite pipe; 2, 9: Particle-charging pipe; 3, 10: Gas-introducing pipe; 4: Dispersing plate; 5: Heater; 6, 12: Particle-discharging pipe; 7, 11: Gas-discharging pipe; and 8, 13: Metallic cover.

DETAILED DESCRIPTION OF THE PREFERRED EMBODIMENTS

Since graphite is highly crack resistant at high temperatures, if the reaction vessel is formed of graphite, a sufficient mechanical strength can be ensured without providing the outside cylinder. In addition, graphite (C) can be purified by means of chlorine gas at high temperatures even though it has been contaminated during the processing. In addition, if the inner surface of the reaction vessel formed of graphite is coated with highly (substantially) pure silicon having a thickness of 100 microns or more, the contamination of the reaction vessel with carbon by the graphite itself and the entrance of contaminants, which have passed through the graphite, within the reaction vessel can be suppressed to a problem-free extent. Accordingly, with the heating apparatus of the present invention, the contamination of semiconductor grade polycrystalline silicon within the reaction vessel can be substantially suppressed.

The coating of the inner surface of the reaction vessel with highly pure silicon is preferably conducted by the thermal decomposition or reducing reaction of a monosilane gas or a chlorosilane gas of semiconductor grade or gas mixtures of these gases and hydrogen gas of semiconductor grade. According to this coating method, the inner surface of the reaction vessel formed of graphite can be simply and strongly coated with highly pure silicon.

In conventional heating apparatuses, a Fe-Cr heater or a Ta heater has been used as the heater for heating the reaction vessel from the outer surface side. It has been found from the present inventors' investigation that there is the possibility that with a metallic heater, polycrystalline silicon within the reaction vessel is slightly contaminated through the wall of the reaction vessel. Accordingly, the heater is not limited but a graphite heater is more suitable.

A preferred embodiment of the present invention is described below.

Figure 1:
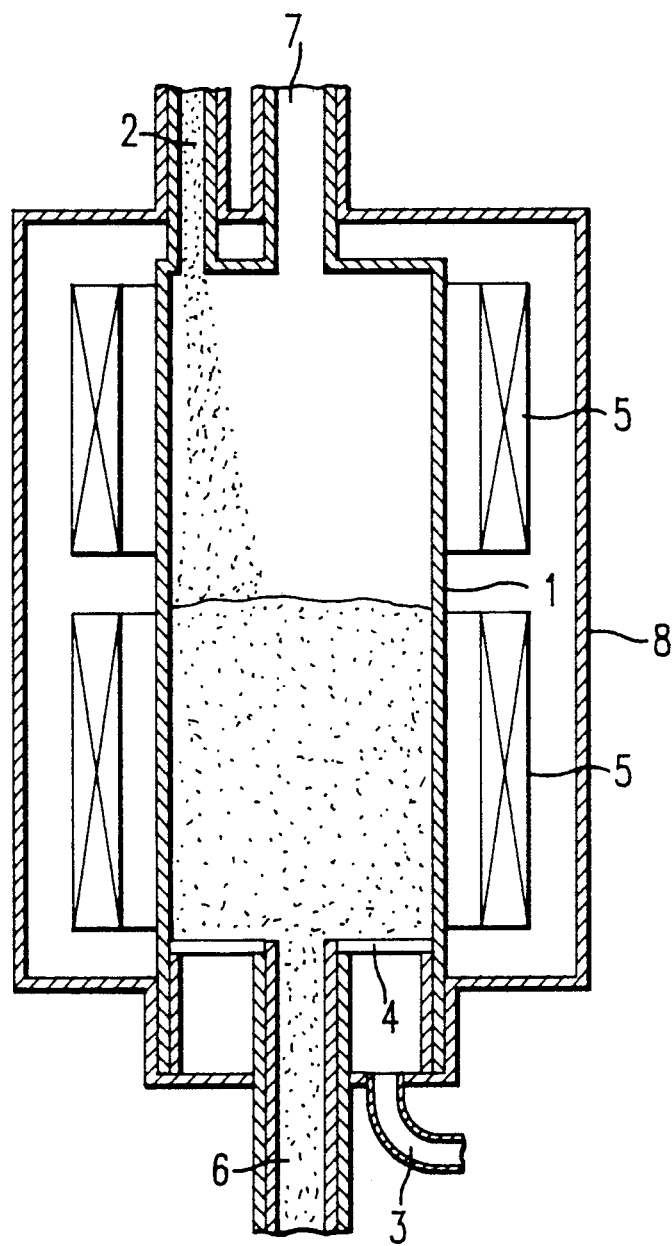
FIGS. 1 and 2 are longitudinal sectional views showing preferred embodiments of the invention.

FIG. 1 is a sectional view showing the heating apparatus of a preferred embodiment of the present invention. An apparatus for producing polycrystalline silicon of semiconductor grade by the fluidized-layer method is shown.

A reaction vessel 1 is cylindrical and provided with a particle-charging pipe 2 and a gas-introducing pipe 7 at an upper portion and an annular porous dispersing plate 4 at a lower portion thereof. A particle-discharging pipe 6 is connected with said dispersing plate 4 from below. The wall of the reaction vessel 1 has a double-layer structure comprising a graphite layer of about 10 to 50 mm thick and a highly pure silicon layer of about 100 to 20,000 microns thick formed on an inner surface of the graphite layer. The reaction vessel 1 is provided with two cylindrical and circular graphite heaters 5 in the vertical direction with an interval between them on an outer circumferential side of the vessel. Reaction vessel 1 is covered with a metallic cover 8 on the outside of the graphite heaters 5 and the metallic cover 8 is provided with a gas-introducing pipe 3 connected therewith at a lower portion thereof.

In the apparatus shown in FIG. 1, small pieces of polycrystalline silicon having particle diameters of about 0.1 to 1 mm are charged into the reaction vessel 1 through the particle-charging pipe 2. In addition, a reaction gas containing trichlorosilane (and about 40% $H_2$ as the balance) is introduced into the reaction vessel 1 through the gas-introducing pipe 3. The reaction gas sent into the reaction vessel 1 is passed through holes of the dispersing plate 4 and sprayed into a layer of small pieces of polycrystalline silicon to fluidize the small pieces of silicon and deposit silicon on a surface of the small pieces. Subsequently, the reaction gas is passed outside of the reaction vessel 1 through the gas outlet. Furthermore, the outer circumferential surface of the reaction vessel 1 is directly heated by means of the graphite heaters 5 to heat the fluidized small pieces of silicon within the reaction vessel 1 to for example, about 600°–1400° C., preferably about 1,000° C. The mean residence time for the small pieces of silicon in the reaction vessel 1 is usually about 30 hours depending upon the size of the reaction vessel. Silicon is deposited on the surface of the small pieces of silicon during this residence time. The small pieces of polycrystalline silicon having particle diameters of about 0.5 to 2 mm, on which silicon has been deposited, are gradually taken out of the reaction vessel 1 through the particle-discharging pipe 6.

Figure 2:
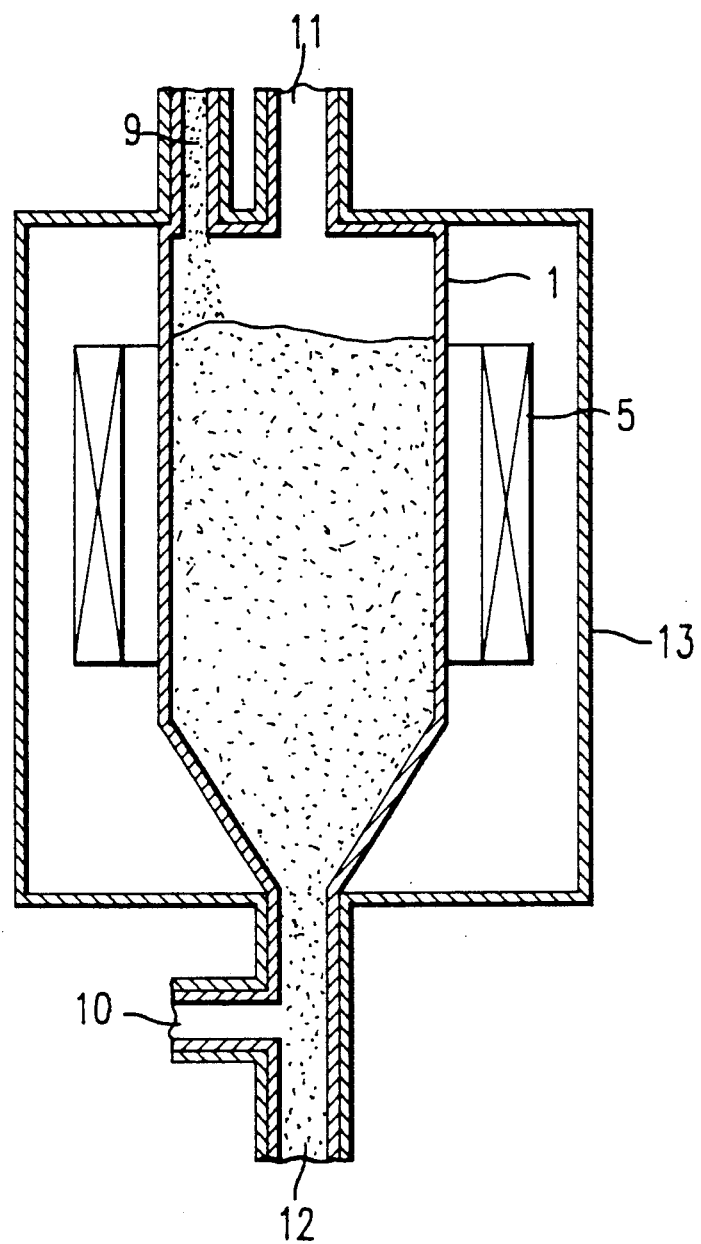

FIG. 2 is a sectional view showing a heating apparatus according to another preferred embodiment of the present invention. An apparatus for heat treating polycrystalline silicon is shown.

The reaction vessel comprises a straight cylindrical portion and a funnel-shaped connecting portion connected with the lower portion of the straight cylindrical portion. The reaction vessel 1 is provided with a particle-charging pipe 9 and a gas-discharging pipe 11 connected with the upper portion thereof and a particle-discharging pipe 12 having a gas-introducing pipe 10 connected with the lower portion thereof. The wall of the reaction vessel 1 has a double-layer structure comprising a graphite layer of about 10 to 50 mm thick and a highly pure silicon layer of about 100 to 20,000 microns thick formed on the inner surface of the graphite layer. The reaction vessel 1 is provided with a cylindrical circular graphite heater 5 disposed on the outer circumferential surface thereof with a gap or annular space between the outer circumference surface of the reaction vessel 1 and the graphite heater 5. The reaction vessel 1 is covered with a metallic cover 13 on the outside of the graphite heater 5.

Small pieces of polycrystalline silicon having diameters of about 0.15 to 2 mm are charged into the reaction vessel 1 through the particle-charging pipe 9. Additionally, argon gas is blown into the reaction vessel 1 at a flow rate of, for example, 10 cm/s through the gas-introducing pipe 10. The argon gas blown into the reaction vessel 1 turns the small pieces of polycrystalline silicon within the reaction vessel 1 into a fluidized layer and is discharged through the gas-discharging pipe 11. At the same time, the graphite heater 5 directly heats the outer circumferential surface of the reaction vessel 1 to heat the small pieces of silicon existing under the fluidizing conditions within the reaction vessel 1 to, for example, about 1,100° C. The small pieces of silicon usually stay within the reaction vessel 1 for about about 1 hour to be subjected to the heat treatment. The small pieces of silicon, which have been subjected to the heat treatment, are gradually taken out of the reaction vessel 1 through the particle-discharging pipe 12.

In addition, the apparatus shown in FIG. 1 can be used also as an apparatus for heat treating polycrystalline silicon by blowing an argon gas and the like in the reaction vessel through a gas-introducing pipe 3.

Figure 3:
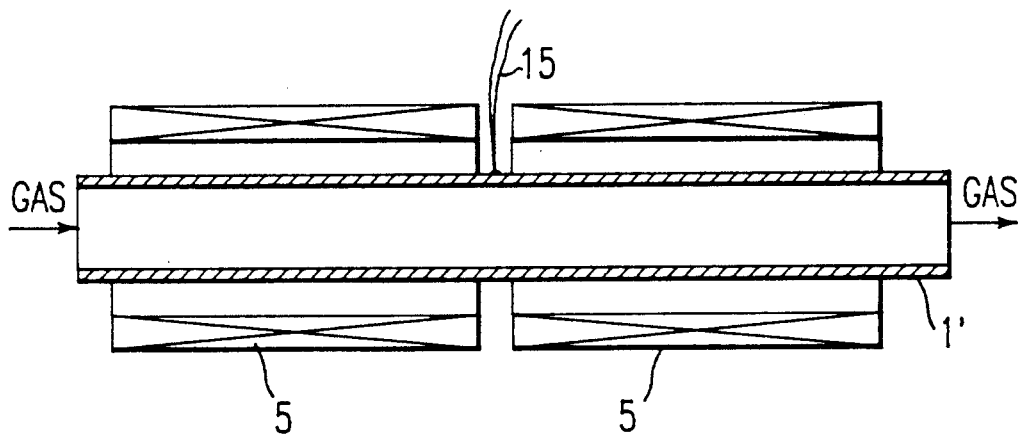
FIG. 3 is a diagram showing the coating of a graphite pipe.

Next, a method of producing the reaction vessel in the heating apparatus according to the present invention and the results of the use of the reaction vessel produced by this method are described giving numerical values (FIG. 3).

A graphite pipe 1' having an inside diameter of 10 cm, a thickness of 1 cm and a length of 120 cm was heated by means of two graphite heaters 5, having a total length of 50 cm measured from the outer surface side thereof. The outer surface temperature at the central portion in the axial direction of the graphite pipe 1' was measured by means of a thermocouple 15 and outputs of the graphite heaters 5, were controlled so that the measured temperature was held at 870° C. Under these conditions, a gas mixture comprising trichlorosilane of semiconductor grade and hydrogen gas of semiconductor grade was passed into the graphite pipe 1' from one end. The quantity of the gas sent into the graphite pipe 1' was controlled so that the flow rate of the gas was about 30 cm/s at 870° C. In addition, the concentration of trichlorosilane in the gas mixture was set at 10% by volume in order to suppress the thermal decomposition of the trichlorosilane gas in the gas phase.

After the above described gas mixture was passed through the graphite pipe 1' for 15 hours, the graphite pipe 1' was cooled, cut in the axial direction and the cross section of the wall of the pipe was observed to measure a distribution of thickness of a silicon coating layer in the axial direction. The thickness of the silicon coating layer was about 100 microns at a portion of the wall a distance of 10 cm from the gas inlet end but a layer, which was determined to be a graphite layer or a silicon carbide layer, appeared in a part of the surface of the silicon coating layer. The thickness of the silicon coating layer was 50 to 100 microns at a portion of the wall at a distance of 10 cm from the gas outlet end, a layer, which was determined to be graphite layer or a silicon carbide layer, but did not appear on the surface of the silicon coating layer. In portions excepting both these end portions, the thickness of the silicon coating layer was 250 to 300 μm and a layer, which was determined to be graphite layer or a silicon carbide layer, was not observed on the surface of the silicon coating layer.

The graphite pipe, which was coated with silicon according to the above described method, was used as the reaction vessel to construct the heating apparatus according to the present invention shown in FIG. 1 and 3 kg of particles of highly pure polycrystalline silicon were subjected to a heat treatment for 10 hours at 1,000° C, while maintaining their fluidized condition by means of the highly pure argon gas in the heating apparatus. A highly pure trichlorosilane gas of semiconductor grade for use in the production of highly pure polycrystalline silicon, which had been practically used as a material for single-crystalline silicon for use in a semiconductor produced by the Chokralskii method, was used in the silicon-coating. Heat treatments by means of comparative apparatus A to E were conducted for comparison. The comparative apparatus A uses a trichlorosilane gas of solar cell grade containing P and B in a quantity of 1 to 5 ppba, C in a quantity of 1 to 5 ppma and heavy metals in a quantity of 50 ppba or more in the silicon-coating. The comparative apparatus B comprising no silicon-coating layer. Comparative apparatus C contains no silicon-coating layer, but has an outer cylinder made of stainless steel. Comparative apparatus D contains both a highly pure silicon-coating layer and an outer cylinder made of stainless steel. In comparative apparatus E, the reaction vessel is made of SiC in place of graphite, but contains no outer cylinder made of stainless steel.

TABLE 1

| | Construction of an apparatus | | |
|---|---|---|---|
| | Reaction vessel | Si-coating (grade of trichlorosilane) | Outer cylinder made of stainless steel |
| Apparatus according to the present invention | Graphite | Applied (semiconductor grade*) | Not used |
| COMPARATIVE APPARATUS | | | |
| A | Graphite | Applied (solar cell grade**) | Not used |
| B | Graphite | Not applied | Not used |
| C | Graphite | Not applied | Used |
| D | Graphite | Applied (semiconductor grade*) | Used |
| E | SiC | Applied (semiconductor grade) | Not used |

*The conc. of P and B is less than 0.5 ppba, C less than 0.5 ppma, and heavy metals less than 30 ppba.
**The concentration of P and B is 1 to 5 ppba, C 1 to 5 ppma, and heavy metals 50 ppba or more.

TABLE 2

| | Concentration of impurities in product granules | | | |
|---|---|---|---|---|
| | P concentration (ppba) | B concentration (ppba) | C concentration (ppma) | Total concentration of heavy metals (ppba) |
| Before the heat treatment | 0.12 | 0.08 | 0.13 | <10 |
| After the heat treatment | | | | |
| Apparatus according to present invention | 0.15 (0.23) | 0.11 (0.19) | 0.16 (0.22) | <10 (25) |

TABLE 2-continued

| | Concentration of impurities in product granules | | | |
|---|---|---|---|---|
| | P concentration (ppba) | B concentration (ppba) | C concentration (ppma) | Total concentration of heavy metals (ppba) |
| COMPARATIVE APPARATUS | | | | |
| A | 0.81 | 0.60 | 0.54 | 10 |
| | (0.89) | (0.69) | (0.60) | (30) |
| B | 0.46 | 0.53 | 86 | 50 |
| | (0.52) | (0.61) | (88) | (70) |
| C | 0.96 | 1.31 | 108 | 100 |
| | (1.02) | (1.40) | (109) | (120) |
| D | 0.62 | 0.41 | 0.18 | 100 |
| | (0.70) | (0.50) | (0.28) | (120) |
| D | 0.28 | 0.32 | 1.52 | 10 |
| | (0.38) | (0.40) | (1.59) | (30) |

The construction of the respective heating apparatus is shown in Table 1 and the concentration of impurities in the highly pure polycrystalline silicon particles before and after the heat treatment is shown in Table 2. Every apparatus used a graphite heater and a Fe-Cr heater as the heater. The results in the case where the Fe-Cr heater was used are shown in parentheses.

As obvious from Table 2, with the apparatus according to the present invention, the concentration of impurities in the polycrystalline silicon particles reaches a semiconductor grade after the heat treatment while with comparative apparatus, the contamination of the polycrystalline silicon particles is remarkably increased after the heat treatment.

Figure 4:
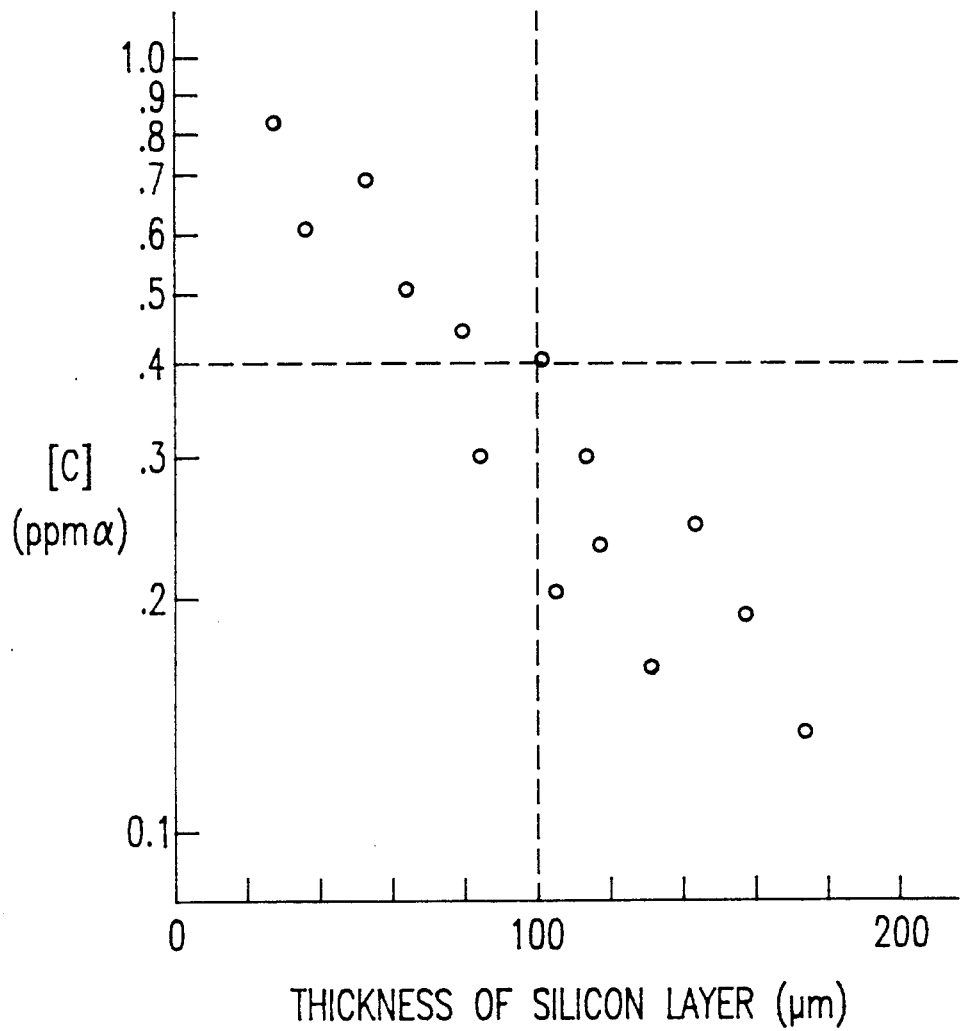
FIG. 4 is a graph showing the relationship between layer-thickness of a silicon-coating layer and the concentration of carbon.

In addition, in the above described coating method, the coating time was adjusted to change the minimum thickness of the silicon coating layer in the portion other than the portions 15 cm long from both ends of the graphite pipe. The results obtained when the above described heat treatment was conducted with various kinds of graphite pipe as the reaction vessel are shown in FIG. 4. Since the change in the concentration of impurities other than carbon was barely noticeable in the highly pure polycrystalline silicon particles after the heat treatment, only the concentration of carbon is shown in FIG. 4. As obvious from FIG. 4, the concentration of carbon at a thickness of the silicon coating layer of 100 $\mu$m or more can be suppressed to 0.4 ppma or less.

As is clear from the above description, the heating apparatus according to the present invention prevents the contamination of polycrystalline silicon within the reaction vessel by impurities contained in the apparatus for the production of polycrystalline silicon by the fluidized-layer method, the heat treatment of polycrystalline silicon and the like and thus the productivity and quality of single-crystalline silicon can be remarkably improved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of producing semiconductor grade polycrystalline silicon, comprising the steps of:
   fluidizing polycrystalline silicon particles in a graphite reaction vessel, the inner surface of which is coated with substantially pure silicon having a thickness of 100 microns or more, one or more heaters being disposed circumferentially around said reaction vessel for directly heating said reaction vessel; and
   depositing semiconductor grade silicon on said particles by thermal decomposition or a reducing reaction of a monosilane gas of semiconductor grade, a chlorosilane gas of semiconductor grade or a gas mixture thereof with hydrogen gas of semiconductor grade.

2. The method of claim 1, wherein said particles have a particle diameter of about 0.1-2 mm.

3. The method of claim 1, wherein thermal decomposition is conducted at a temperature of about 600-1400° C.

4. The method of claim 1, wherein said semiconductor grade silicon is deposited on said particles for a period of time from about 1-30 hours.

5. The method of claim 1, wherein said heaters are cylindrical heaters.

6. The method of claim 1, wherein said heaters are graphite heaters.

7. The method of claim 1, wherein said reaction vessel comprises a cylindrical walled vessel having a particle-charging piping and an upper gas-introducing pipe communicating with the upper portion thereof and a particle-discharging pipe and a lower gas-introducing pipe communicating with the lower portion thereof.

8. The method of claim 7, wherein the lower portion of said reaction vessel comprises an annular porous discharging plate circumferentially attached to said particle-discharging pipe.

9. The method of claim 8, wherein said lower gas-introducing pipe communicates with the lower portion of said reaction vessel through said porous dispersing plate.

10. The method of claim 1, wherein said reaction vessel comprises a straight cylindrical walled vessel, a funnel-shaped portion communicating with said cylindrical vessel, a particle-charging pipe and a gas-discharging pipe communicating with the upper portion thereof and a particle-discharging pipe and gas-introducing pipe communicating with the lower portion thereof, wherein said particle-discharging pipe communicates with the apex of said funnel-shaped portion.

11. The method of claim 10, wherein said gas-introducing pipe communicates with said particle-discharging pipe.

12. The method of claim 1, further comprising a metallic cover surrounding said reaction vessel and said heaters.

13. The method of claim 1, wherein said heaters are arranged to provide an annular space between the outer surface of said reaction vessel and said heater.

14. The method of claim 1, wherein said silicon on the inner surface of said reaction vessel is produced by thermal decomposition or a reducing reaction of a monosilane gas, chlorosilane gas or a gas mixture thereof with hydrogen gas of semiconductor grade.

* * * * *